(12) United States Patent
Gandrabur et al.

(10) Patent No.: US 9,330,089 B2
(45) Date of Patent: May 3, 2016

(54) METHOD AND APPARATUS FOR A MULTI I/O MODALITY LANGUAGE INDEPENDENT USER-INTERACTION PLATFORM

(71) Applicant: Nuance Communications, Inc., Burlington, MA (US)

(72) Inventors: Simona Gandrabur, Verdun (CA); Eric Buist, Montreal (CA); Andrei Dragoi, Montreal (CA); Alireza Salimi, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/934,668

(22) Filed: Nov. 6, 2015

(65) Prior Publication Data

US 2016/0070695 A1    Mar. 10, 2016

Related U.S. Application Data

(63) Continuation of application No. 13/960,755, filed on Aug. 6, 2013, now Pat. No. 9,214,156.

(51) Int. Cl.
*G10L 15/00* (2013.01)
*G10L 15/18* (2013.01)
*G06F 17/27* (2006.01)

(52) U.S. Cl.
CPC ........ *G06F 17/2785* (2013.01); *G06F 17/2715* (2013.01)

(58) Field of Classification Search
CPC ...................................................... G06F 17/02
USPC ........................... 704/1, 9, 10, 257, 270–275
See application file for complete search history.

(56) References Cited

U.S. PATENT DOCUMENTS

| | | | |
|---|---|---|---|
| 6,377,913 | B1 | 4/2002 | Coffman et al. |
| 6,701,294 | B1 | 3/2004 | Ball et al. |
| 6,704,708 | B1 | 3/2004 | Pickering |
| 7,277,854 | B2 | 10/2007 | Bennett et al. |
| 7,472,060 | B1 | 12/2008 | Gorin et al. |
| 9,214,156 | B2 | 12/2015 | Gandrabur et al. |
| 2003/0088421 | A1 | 5/2003 | Maes et al. |
| 2005/0171779 | A1 | 8/2005 | Joublin |
| 2015/0046168 | A1 | 2/2015 | Gandrabur et al. |

*Primary Examiner* — Jesse Pullias
(74) *Attorney, Agent, or Firm* — Hamilton, Brook, Smith & Reynolds, P.C.

(57) ABSTRACT

Automated user-machine interaction is gaining attraction in many applications and services. However, implementing and offering smart automated user-machine interaction services still present technical challenges. According to at least one example embodiment, a dialogue manager is configured to handle multiple dialogue applications independent of the language, the input modalities, or output modalities used. The dialogue manager employs generic semantic representation of user-input data. At a step of a dialogue, the dialogue manager determines whether the user-input data is indicative of a new request or a refinement request based on the generic semantic representation and at least one of a maintained state of the dialogue, general knowledge data representing one or more concepts, and data representing history of the dialogue. The dialogue manager then responds to determined user-request with multi-facet output data to a client dialogue application indicating action(s) to be performed.

20 Claims, 7 Drawing Sheets

Dialogue:
- Say "consult agenda" or "add a new meeting"
- schedule a meeting

ASR:
1. Schedule a meeting

Raw NLU:
1. [Attribute:agenda] [Attribute:meeting]
2. [Intention:add] [Attribute:meeting]

FINAL INTERPRETATION:
1. [Intention:add] [Attribute:meeting]

Context: if Intention is in focus, favor 2.

Dialogue:
*Add a meeting Tuesday October thirteen at ten with Matthieu Hébert*

ASR:
1. add a meeting tuesday september thirteen at ten with matthieu hébert
2. add a meeting tuesday october thirteen at ten with matthieu hébert Raw NLU:
1. [Intention: add] [Attribute: meeting] [Date: 09/13/2009] [Time: 1000] [Participant: Hébert,Matthieu]
2. [Intention: add] [Attribute: meeting] [Date: 10/13/2009] [Time: 1000] [Participant: Hébert,Matthieu]

Deep NLU:
1. [Intention: add] [Attribute: meeting] [Date: 10/13/2009] [Time: 1000] [Participant: Hébert,Matthieu]
2. [Intention: add] [Attribute: meeting] [Date: 09/13/2009] [Time: 1000] [Participant: Hébert,Matthieu]

Reranking Hit!
- Context: current-date = October 09, 2009
- World-knowledge:
  P(10/13/2009 | current-date) > P(09/13/2009 | current-date)

FIG. 4D

METHOD AND APPARATUS FOR A MULTI I/O MODALITY LANGUAGE INDEPENDENT USER-INTERACTION PLATFORM

RELATED APPLICATION

This application is a continuation of U.S. application Ser. No. 13/960,755, filed Aug. 6, 2013. The entire teachings of the above application are incorporated herein by reference.

BACKGROUND OF THE INVENTION

Achieved advances in speech processing and media technology lead to wide use of automated user-machine interaction across different applications and services. Using an automated user-machine interaction approach, businesses may provide customer services and other services with relatively inexpensive cost.

SUMMARY OF THE INVENTION

According to at least one example embodiment, a method and corresponding apparatus for automatically managing a dialogue with a user comprises transforming, at a dialogue manager, user-input data received from a client dialogue application into a generic semantic representation, the generic semantic representation being independent of a language and an input modality associated with the user-input data; determining, by the dialogue manager, whether the user-input data is indicative of a new request or a refinement request refining one or more previous requests by the user, based on the generic semantic representation and at least one of a maintained state of the dialogue, general knowledge data representing one or more concepts, and data representing history of the dialogue; and sending multi-facet output data, indicative of one or more actions for the client dialogue application to perform the one or more actions being determined based on a result of said determining whether the generic semantic representation is indicative of a new request or a refinement of a previous request.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4A-4D illustrate examples of how user-input data is processed at different stages.

DETAILED DESCRIPTION OF THE INVENTION

Figure 1:
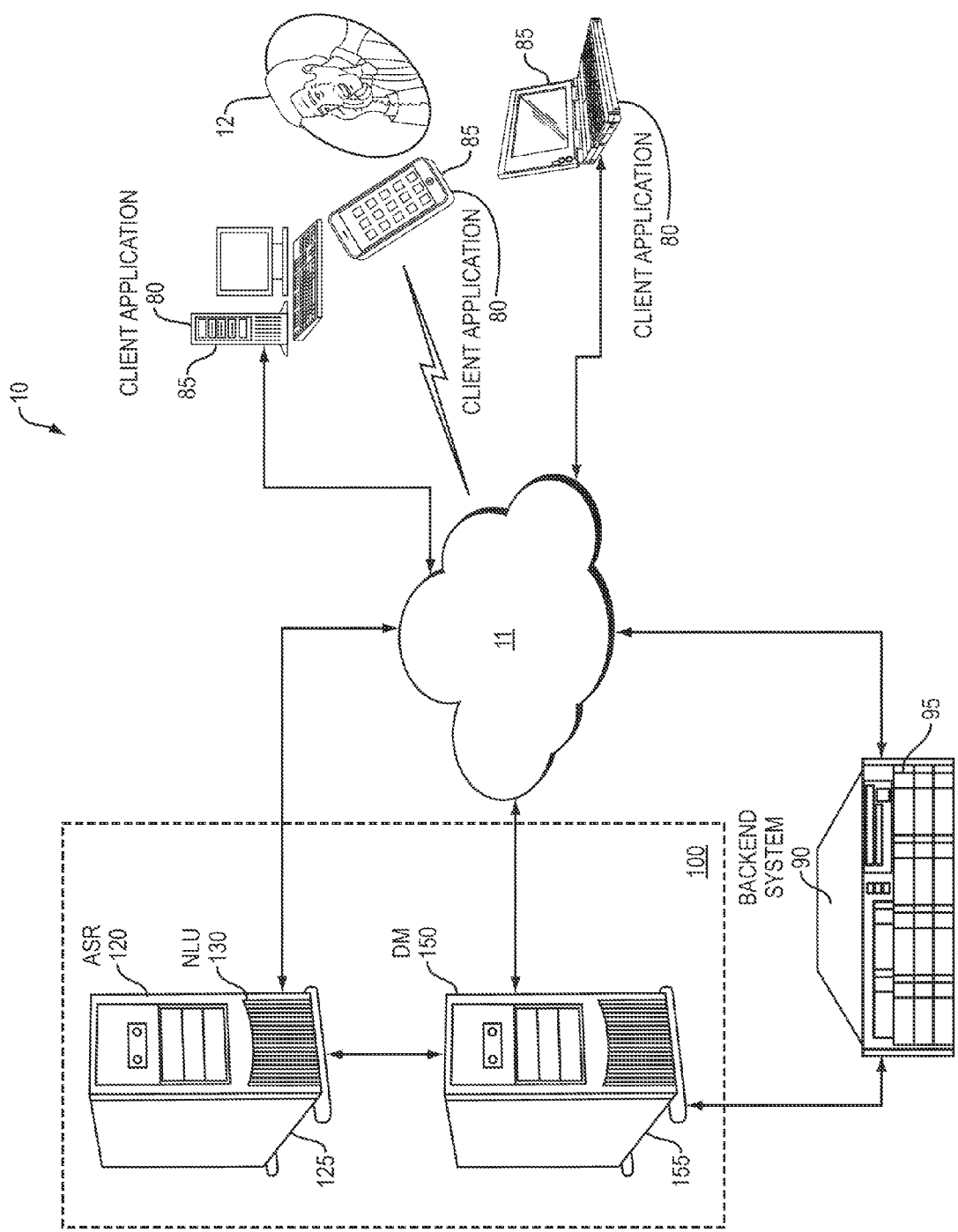
FIG. 1 is an example computer system illustrating an implementation of an automatic user-machine interaction system, according to at least one example embodiment.

A description of example embodiments of the invention follows.

With significant advances achieved in speech processing in general, and speech recognition in particular, a wide range of automated speech-based, user-machine, interaction services have been deployed in connection with, for example, mobile devices, call centers, banking applications, or the like. Such automated speech-based interaction services enable users, for example, to talk to their mobile devices, which respond in return with audio utterances. Also, call centers employing an interactive voice response (IVR) system enable a user to interact with an automatic machine. Other interaction services enable chat-based user-machine interaction. However, chat-based interaction services are not fully automated and typically involve a human agent responding to questions or requests from a user in a chat conversation.

Services employing user-machine interaction include, for example, dialogue applications for scheduling or accessing travel itineraries, dialogue applications for location-based services (e.g., for performing location-based searches), personal data dialogue applications (e.g., for accessing email, calendar, and contact information, TV guide dialogue applications, banking dialogue applications, the like), or a combination thereof. Such services may be implemented as a single application (e.g., IVR application), or a combination of a client application (e.g., residing on client device) and a server application (e.g., residing on a computer server).

Typical user-machine interaction systems are language dependent, input/output (I/O) modality dependent, and backend system dependent. Specifically, typical user-machine interaction systems support interaction services based on a specific language, e.g., English, Chinese, Spanish, Arabic, or the like. With respect to I/O modalities, user-machine interaction systems usually support a single input or output modality, e.g., speech, chat or text, touch, or the like. Some user-machine interaction systems, e.g., IVR applications, may support two modalities, for example, by enabling a user to make an input by uttering a specific word or clicking on a specific button on the user's device. However, in such cases where one of two modalities may be selected, the user's vocabulary choice is very limited. Also, typical user-machine interaction system implementation takes into account data formatting within backend system(s) typically accessed for retrieving data of interest. In other words, a typical user-machine interaction system is usually designed and implemented for a specific service with specific requirements, e.g., specific language, specific input and output modalities, or backend system with specific data representation. Also, a typical user-machine interaction service usually does not support multiple I/O modalities.

The dependence of a user-machine interaction system on a specific corresponding language, specific input modality, specific output modality, or data representation associated with a corresponding backend system makes such a system subject to functional limitations. Furthermore, such dependency increases implementation complexity and prevents reuse of system modules. In addition, the implementation complexity and module-implementation redundancy associated with implementing various user-machine interaction applications, e.g., subject to different requirements, translate into high monetary cost and time delay associated with deployment of such systems.

According to at least one example embodiment, a language-independent user-machine interaction platform, or mechanism, is configured to support multiple I/O modalities, manage complex dialogue interaction(s), and interact with backend system(s) regardless of corresponding data format. The ability to manage complex dialogue interaction(s) (e.g., with relatively significant flexibility to users in terms of vocabulary, context, and input modalities available) leads to enhanced user experience. In other words, by providing such flexibility, by the user-machine interaction platform, while still managing a meaningful dialogue with the user, leads to dialogue dynamics similar to those in dialogues between two humans. As such, relatively high user satisfaction may be achieved.

FIG. 1 is an example computer system 10 illustrating an implementation of an automatic user-machine interaction system 100, according to at least one example embodiment. The automatic user-machine interaction system 100 includes a dialogue manager (DM) 150 residing, for example, on a computer server 155. The DM 150 is configured to process and manage dialogue interactions with one or more users 12. The DM 150 is also configured to access a backend system 90, associated with one or more computer servers 95, to retrieve data that may be of interest to the user 12. The automatic user-machine interaction system 100 also includes an automatic speech recognition (ASR) module 120, configured to translate speech signals into textual data, and a natural language understanding (NLU) module 130, configured to transform textual data into semantic representations indicative of corresponding meaning. According to an example implementation, the ASR module 120 and the NLU module 130 may both reside on a computer server 125. The automatic user-machine interaction system 100 is coupled, through a communications network 11, to one or more client dialogue applications 80 residing on one or more corresponding client devices 85, such as mobile devices, personal computers, laptop devices, fixed-line phones, or the like.

According to at least one example embodiment, a user 12 initiates a dialogue with the DM 150, for example, by launching a client dialogue application 80, associated with a user-machine interaction service, on the corresponding user device 85. Example client dialogue applications 80 include dialogue-based, travel-scheduling, client applications, client dialogue applications for location-based services, client dialogue applications for managing personal data, TV guide dialogue-based client applications, banking dialogue-based client applications, the like, or a combination thereof.

During the dialogue, user-input data, e.g., speech, text, touch or click, etc., is provided by the user 12 to the client application 80. The client application 80 is configured to forward the user-input data provided by the user 12 towards the automatic user-machine interaction platform 100. Example embodiments of the automatic user-machine interaction platform 100 and the client application 80 enable the user 12 to engage in a dialogue with the DM 150 using, for example, chat-based input, speech based input, touch/click-based input, or a combination thereof. In other words, the automatic user-machine interaction system 100 is configured to support multiple input/output (I/O) modalities, and, therefore, provides the user 12 with flexibility to select from the I/O modalities supported by the corresponding client application 80.

User-input speech data, forwarded by the client application 80, is sent to the ASR module 120. The ASR module 120 is configured to perform speech recognition and transform a user-input speech data entry into one or more corresponding textual output entries. The ASR module 120 may also be configured to provide ranking information or confidence scores associated with each of the one or more textual output entries. The confidence scores represent a measure of accuracy of the speech recognition outputs of the ASR module 120, whereas the ranking information is indicative of relative correctness among multiple speech recognition outputs.

Textual data received at the automatic user-machine interaction system 100 is processed by the NLU module 130. The NLU module 130 is configured to process textual data and generate corresponding meaning interpretation(s). The meaning interpretations are provided by the NLU module 130 in the form of semantic representations. The NLU module 130 may also be configured to provide confidence score(s) associated with the generated meaning interpretation(s). Input textual data to the NLU module 130 may be received from the ASR module 120, e.g., if the user-input data is speech data, or from the client dialogue application 80, e.g., if the user-input data is textual data. In the case where user-input data is provided by the user 12 through touch of display icons or clicking buttons of the client device 85, the user-input data may be sent directly to the DM 150, e.g., without passing through the ASR module 120 or NLU module 130.

User-input data, or a representation thereof, is analyzed by the DM 150 and a user-intent is determined. In other words, each input entry by the user 12, or a representation thereof, is analyzed to identify a corresponding request by the user 12. The DM 150 then takes proper action(s) to respond to the request of the user 12, and a response is sent back to the client application 80. The client application 80 is configured to render output data to the user 12 based on the response received from the DM 150. Proper actions performed by the DM 150 include accessing the backend system 90 to retrieve data related to user's request(s).

Figure 2:
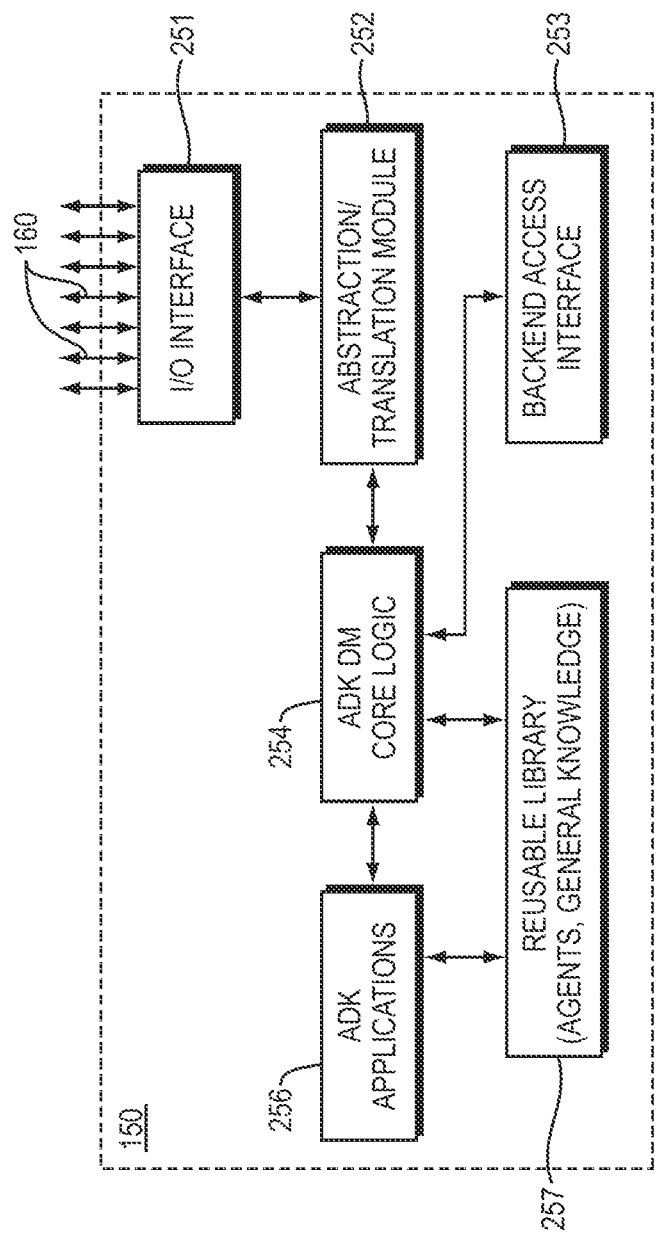
FIG. 2 is a block diagram illustrating components of a dialogue manager, according to at least one example embodiment.

FIG. 2 is a block diagram illustrating components of the DM 150, according to at least one example embodiment. The DM 150 includes an input/output (I/O) interface 251 coupled to plurality of communication channels 160. The communication channels 160 link the DM 150 to the NLU module 130, the ASR module 120, and the client devices 85 through the communications network 11. The I/O interface 251 is coupled to an abstraction/translation module 252 configured to transform input data, received through the I/O interface 251, into corresponding language-independent generic semantic representation(s). According to an alternative implementation, the abstraction/translation module 252 is part of the NLU module 130 or is a deep NLU module. In such case, user-input data, regardless of the corresponding input modality, is sent to the NLU module 130 for generating the corresponding generic semantic representation(s).

The generic semantic representation may be in the form of a list of semantic slots or a sequence of nested semantic slots. Each semantic slot includes a language-independent string indicative of a canonical meaning. According to at least one example embodiment, instances of input data associated with distinct input modalities, but indicative of the same meaning, result in the same generic semantic representation. As such, the generated language-independent generic semantic representation is independent of the input modality associated with the corresponding user-input data. For example, if the user-input data is indicative of a selection of a particular item among multiple items, the abstraction/translation module 252 is configured to generate the same generic representation indicative of the user's selection regardless of whether the user 12 responded with speech, text, or touch/click. Also, a touch-based user-input field results in a generic semantic representation that an equivalent speech/text interaction would have triggered. For example, touching a "Cancel" button is treated equivalent to saying or typing "cancel that."

The language-independent generic semantic representation(s), e.g., generated by the abstraction/translation module 252 or the NLU module 130, is then forwarded to a DM core logic 254. The DM core logic 254 is configured to manage the ongoing dialogue with the user 12. Specifically, the DM core logic 254 is configured to analyze the generic semantic representation(s), corresponding to a user-input data entry, identify a corresponding user request, and take proper action(s) to generate and send a response back to the user device 85. For example, as part of the ongoing dialogue, the user 12 may request information regarding a specific TV program. The DM core logic 254 is configured to determine the context and details of the user request. Then, the DM core logic 254 generates a query to retrieve data related to the user request from the backend system 90. The query is sent to the backend system 90 through the backend access interface 253. The backend access interface 253 is configured to forward queries and corresponding responses between the DM core logic 254 and the backend system 90. The backend system 90 includes, for example, one or more databases associated with one or more corresponding services, Internet servers, servers or databases associated with a business entity, or the like.

Upon receiving a response from the backend system 90, the DM core logic 254 generates a multi-facet (or multi-faceted) output (not shown) for sending to the client application 80. The multi-faceted output includes language-dependent and/or language-independent content. Language-dependent content includes, for example, content for rendering to the user 12 by the corresponding client application 80, such as text, speech, or the like. Language-independent content includes, for example, instructions to the client applications 80 and semantic representations of prompts. The multi-facet (or multi-faceted) output is sent to the client application 80 through the I/O interface 251 and one or more of the communication channels 160. Upon receiving the multi-facet output, the client application 80 is configured to cause corresponding content to be rendered on the corresponding client device 85.

The DM 150 also includes a plurality of executable server dialogue applications 256 coupled to the DM core logic 254. According to at least one example embodiment, for each client dialogue application 80, there is a corresponding server dialogue application 256. Also, upon the user's 12 launching the client dialogue application 80, the DM core logic 254 is made aware of the user's action and is configured to launch a corresponding server dialogue application 256. Each client dialogue application 80 and corresponding server dialogue application 256 corresponds to a dialogue-based service, such as a travel scheduling service, location-based search service, personal data access and management service, banking service, or the like. As such, the DM 150 is configured to support and handle a plurality of dialogue applications instead of being designed for a specific dialogue application.

The DM 150 also includes a re-usable library 257. The re-usable 257 library may be stored as one or more databases within at least one memory component (not shown), e.g., associated with the computer server 155. The re-usable library 257 includes data representative of general, or world, knowledge. The general knowledge is described in terms of concepts. A concept represents a general knowledge idea, or notion. A calendar, travel itinerary, TV program or movie, bank account, etc., are examples of a concept. Concepts may be linked. For example, a calendar concept is linked to a meeting concept, which is, in turn, linked to duration and participants concepts. Concepts may be implemented, for example, as object-oriented classes or as nested data structures. A concept may also be associated with one or more attributes or values. For example, a "DURATION" concept expects an attribute or value indicating the value of the duration.

The re-usable library 257 also includes agents. Agents may be viewed as distributed computation or processing modules, e.g., associated with concepts, defining executable tasks or sub-tasks. As such, server dialogue applications 256 may be implemented in terms of the predefined agents. Client dialogue applications 80 may also be implemented in terms of the same agents. In managing an ongoing dialogue, the DM core logic 254 is configured to execute tasks or sub-tasks by dispatching corresponding agents.

The generic semantic representation(s), e.g., obtained from the abstraction/translation module 252 or the NLU module 130, may be in an application-specific format but is/are independent of the corresponding language and the corresponding I/O modalities. As such, implementation of the server dialogue applications 256 is independent of the way the user-input data is obtained, e.g., independent of the corresponding language and corresponding I/O modalities. That is, implementation of the server dialogue applications 256, or components thereof, is decoupled from the corresponding language, input/output specific surface implementation, or input-output modalities. Furthermore, the implementation of the client application 80 is decoupled from the specifics of the DM 150 and the corresponding DM core logic 254. In addition, the DM 150 is enabled to support multiple client applications 80, distinct languages, and distinct I/O modalities.

According to at least one example embodiment, the query (not shown) generated by the DM core logic 254 includes a target data source, operation, optional limit over the number of returned results, and some attributes acting as modifiers or constraints. The target data source may correspond to a concept on which queries are performed, e.g., a calendar, while constraints and modifiers are attributes of that concept. Common operations are selection, insertion, update and removal. Selection and removal operations rely on constraints, insertions require modifiers corresponding to the attributes of the item to add, and modification requires both constraints and modifiers.

The query may be encoded as a string of characters, using some query language, or encoded as function calls into objects representing data sources. When using the query language, an application 256 calls a generic function accepting a string of characters and returning a list of concepts. The function also needs to provide a mechanism telling the caller that the query is asynchronous and getting results will require a new call later. The application 256 makes the query in the appropriate language, calling the function without depending on a particular implementation. When using the functional representation, each data source has an interface defining the allowed query functions. The application obtains a reference to a data source and calls only the defined functions on that data source. Each function has a specific name and a particular list of argument types, and returns a value of a determined type.

There are two different types of implementations for the data source interfaces: synchronous or asynchronous. The synchronous implementations immediately provide the requested data to the application 256 upon call. The data is either in memory or backed by some kind of database or distributed service. The asynchronous data sources, on the other hand, do not return results immediately upon request. They rather indicate that the result is not ready and need to be called back with the same query to provide the obtained result, after control is returned to the dialog manager and given back to the application 256. Asynchronous data sources require a special behavior of the application 256, which slightly differs from synchronous-only data sources. When the results are not ready, the application 256 must return control to the DM core logic 254 and be prepared for being called back and resent the exact same query. The DM core logic 254 is the component making sure the query gets executed, by running it in the background or sending it to another remote component.

According to an example implementation, data source implementations are instantiated during the implementation of the application 256 and are retrieved by the application components by going through the DM core logic 254. The instantiation logic, e.g., the DM core logic 254, is thus centralized rather than being spread across application components, so implementations can be changed easily.

Figure 3:
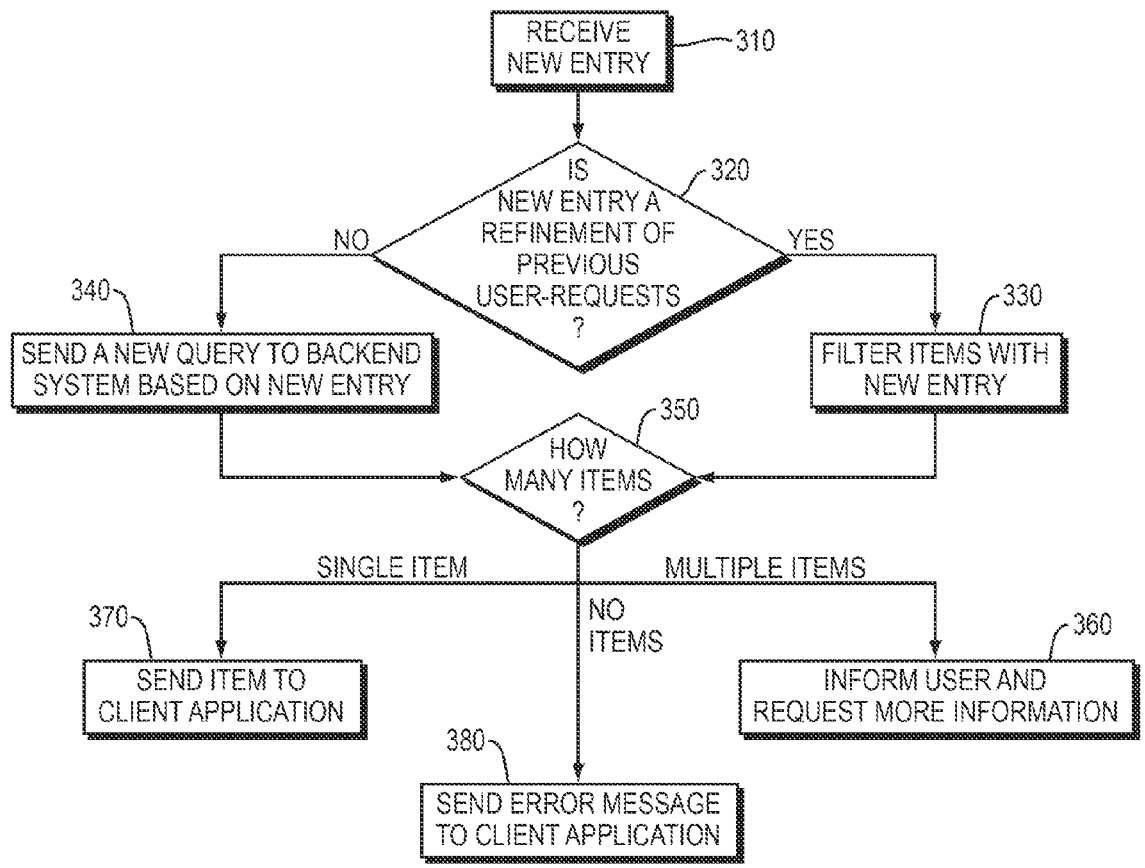
FIG. 3 is a flowchart illustrating a method of managing a dialogue, according to at least one example embodiment.

FIG. 3 is a flowchart illustrating a method of managing a dialogue performed by the DM core logic 254, according to at least one example embodiment. At block 310, the DM core logic 254 receives a new entry as part of an ongoing dialogue. The new entry is a generic semantic representation corresponding to user-input data received from a client application 80. At block 320, the DM core logic 254 determines whether the received new entry is indicative of a new user-request or a refinement of one or more previously received user-requests. For example, if the user 12 is looking for something interesting to watch on TV, the user may start by requesting to learn what movies are on tonight. Seeing a long, possibly-incomplete, drop-down list of search results, the user 12 starts refining the request by uttering "How about comedies?" and then "Is Adam Sandler on?" So far, these utterances are clearly correlated, consecutive refinements. But then the user 12 asks "Any historic dramas?" At this point, is the user 12 still looking for movies with Adam Sandler or comedy movies? Probably not, but the user 12 is probably still looking for movies that are on tonight. In other words, the DM core logic 254 determines, at block 320, whether there is a correlation among a sequence of user-requests.

According to at least one example embodiment, the dialogue manager 150 is configured to employ a correlation measure to determine whether a current request received from the user 12 represents a refinement of previous requests received from the user 12 or a new request that is independent of previous requests. The correlation measure is evaluated using one or more features, such as linguistic features, NLU features, dialogue context, dialogue history, dialogue scope, or general knowledge. For example, with regard to linguistic features, missing verbs, ellipses, or used pronouns are interpreted as indicative of a correlation between the current request and previous request(s). As to NLU features, the NLU module 130 or the abstraction/translation module 252 interpret certain wordings as indicative of concepts carried over from context. For example, when a sentence starts with "how about . . . ," the user intent determined based on previous user requests applies to the current request, and the NLU module 130 or the abstraction/translation module 252 generates a corresponding output: "INTENTION=context." If, for example, a sentence in the current user-request contains a personal pronoun, e.g., "call her," the NLU module 130 or the abstraction/translation module 252 generates an output "PERSON=context" indicating that the person referred to as "her" is somebody mentioned in the conversation history. As such, whenever the output generated by the NLU module 130 or the abstraction/translation module 252 contains concepts with value equal to "context," that is a reliable indication that the current request is a refinement or, at least, carries over context from previous request(s).

The output of the abstraction/translation module 252 or the NLU module 130 includes one or more concepts, such as "INTENTION," "PERSON," "PARTICIPANT," "DATE," . . . , or the like. In the case when a given concept, which is expected to be present, is detected to be missing within the output of the abstraction/translation module 252 corresponding to the user-input data, then the lack of such concept is interpreted as indicative of a refinement request. For example, if the abstraction/translation module 252 generates an output with no "INTENTION" concept, but includes one or more other concepts, such as "DATE," "TIME," "PERSON, or the like, this is evidence of a context carry-over in the current user-input data from a previous user-input data. The DM core logic 254 is configured to determine how far in the dialogue history the missing concepts may be found. In other words, upon determining that an expected concept is missing in the output of the abstraction/translation module 252, the DM core logic 254 checks the dialogue history to determine at which step of the dialogue attributes associated with the missing concept are found. According to at least one example embodiment, each step of the dialogue is recorded in the dialogue history. The dialogue history may also include a current set of selected items retrieved from the backend system 90 based on previous steps of the dialogue. A step of the dialogue is defined as a user-input or a prompt by the dialogue manager 150.

In determining whether the user-input data is indicative of a new request or a refinement request, boundaries of context carry-over from previous user-request(s) to a current user-request are configured based on dialogue scope or independent stand-alone tasks. For example, considering an ADK application for scheduling meetings, making restaurant reservations, placing calls, sending emails, etc., some of these tasks are recognized, e.g., by the DM core logic 254, as incompatible so that no carry-over is allowed between any two of such incompatible tasks. According to an example scenario, sending emails and making restaurant reservations are defined as incompatible tasks.

Another criterion that may be employed in determining whether the user-input data is indicative of a new request or a refinement request is the general knowledge data stored, for example, in the reusable library 257. In other words, correlation between concepts associated with different input data may be determined based on semantic distance. For example, the "ACTOR=Adam Sandler" has a close semantic distance to "GENRE=comedy," and these two concepts with the corresponding attributes have a high semantic correlation. However, the semantic correlation between "ACTOR=Adam Sandler" and "GENRE=sports" is much lower.

According to another example embodiment, determining whether the user-input data is indicative of a new request or a refinement request may also be based on the state of the dialogue. The state of the dialogue may include one or more values or attributes that define the user's request(s) up to the receiving of the generic semantic representation corresponding to the current user-input data. The DM core logic 254 may compare concepts and corresponding attributes in the generic semantic representation with concepts and corresponding attributes associated with the previous query sent to the backend system 90.

A person skilled in the art should appreciate that in determining whether the user-input data is indicative of a new request or a refinement request, one or more correlation measure values may be computed based one or more features. The dialogue manager 150 keeps track of the dialogue history, the set of current selected items, or search results, at each step, and the current state of the dialogue. At each new user-input, the DM core logic 254 iterates through entries of the dialogue history, from the previous user-request towards further away interactions, and computes a measure of correlation. The same approach may be applied by iterating through entries of the state of the dialogue or the set of selected items. As soon as the correlation measure is high enough, e.g., above a configurable threshold, it is determined that the current user-input data is indicative of a refinement request. Alternatively, the correlation may be checked by comparing concepts and corresponding attributes associated with the generic semantic representation against concepts and corresponding attributes associated with other data available to the DM core logic. The current user-input data may be determined to be indicative of a refinement request or a new request by checking predefined conditions instead of computing correlation measure values.

Upon determining that the user-input data is indicative of a refinement request, a list of items (not shown) representing search results is filtered at block 330. The list of items represents search results obtained, for example, from the backend system 90 throughout previous steps of the dialogue. The list of items is filtered based on concepts and corresponding attributes in the generic semantic representation associated with user-input data. A person skilled in the art should appreciate that filtering may be performed either by maintaining the list of items at the dialogue manager 150 and filtering the maintained list of items by the DM core logic 254, or by sending a refined query to the backend system 90 and receiving a corresponding response. However, if at block 320 the DM core logic 254 determines that the user-input data is indicative a new request, a new query corresponding to the new request is sent to the backend system 90 at block 340, and a corresponding response is received at the dialogue manager 150. The response includes one or more items representing search results associated with the query sent to the backend system 90. The user-input data is determined to be indicative of a new request if a predefined distance in time/dialogue history is exceeded or if a task boundary is detected at block 320.

Upon receiving the filter list of items, or upon receiving a response to the query sent to the backend system 90, the DM core logic 254 checks at block 350 the number of items associated with the filtered list or the received response. If the number of items is determined to be equal to one, an indication of the single item is sent, at block 370, to the client dialogue application 80 associated with the user 12. If the number of items is determined to be larger than one, a message or prompt is sent to the user 12, at block 360, informing that multiple items corresponding to the user-request are available. The user may further be asked to provide further information allowing further filtering of the multiple items. However, if it is determined that no items are available corresponding to the user-request, an error message is sent at block 380 to the user 12 through the client dialogue application 80.

According to at least one example embodiment, in implementing generic item selection or filtering, e.g., at block 330, a hierarchical representation of the items allowing retrieval of items' attributes is employed. Also, a selector/filtering mechanism enabling selection based on a rank or an instance of the item or item's attributes is used. In the following, the selector/filtering mechanism is referred to as the selector. Each item is represented as a concept with corresponding one or more values or attributes. The user-input data sometimes does not include a specification of a full complex concept, such as contacts, with full information or complete travel itineraries, but rather only one or more attributes of the concept. Upon sending to the user 12 an indication of a multi-items list, the DM core logic 254 receives a response from the user 12 or the corresponding client dialogue application 80. Based on the received response, the DM core logic 254 reacts according to one or more rules. For example, if an explicit item rank is obtained, e.g., "the first," and the rank is smaller than the number of candidates, then the DM core logic 254 or the selector selects the referred item and returns it to the user 12. If the given rank is higher than the number of candidates, then the DM core logic 254 or the selector returns an error message to the user 12 and waits for input.

However, if the user refers to a particular value, for example, "2:30" in the case of selecting a time, the supplied value is matched against one of the values associated with the items in the list of items. If the value is matched, the corresponding item is returned to the user 12 or retained in the filtered set of items. Otherwise, the received value is further processed by the DM core logic; for example, the received value may be accepted as a new value or it may trigger a new invocation of the selector. For two concepts to match, they usually share the same name, their corresponding values match, and any attribute they commonly define also match. Value equality implies value matching for any concept, while some concepts may extend the definition of matching beyond equality. For example, two strings may be defined to match if they share a common non-empty substring. For example, if one of multiple candidate items presented to the user 12 has a date value presented as Apr. 23, 2012 and the received response has a date with only the day set to 23 and other attributes missing, the selector matches the candidate. On the other hand, if the received response has the day set to 23 and month set to May, then the selector does not match the received value to the presented item with date being Apr. 23, 2012. Also, if any attribute is obtained from user's input, only the item(s) with matching attributes is/are retained. For example, when selecting an itinerary, if one obtained attribute is a date, then any selected itinerary would have the same date as the obtained date from the user 12. Matching follows the same rules as for selection by item.

Moreover, the selection mechanism works over multiple modalities through a language independent and input modality independent communication. In other words, the selection/filtering is performed based on the generic semantic representation corresponding to the user-input data.

FIGS. 4A-4D illustrate examples of how user-input data is processed at different stages. The "Dialogue" describes speech data played to the user 12 or uttered by the user 12. The "ASR" describes the output of the ASR module 120 corresponding to the user-input speech data. The "Raw NLU" describes the output of the NLU module 130 based on the output of the ASR module 120. The "FINAL INTERPRETATION" refers to the interpretation of the user-input data by dialogue manager 150.

Figure 4A:
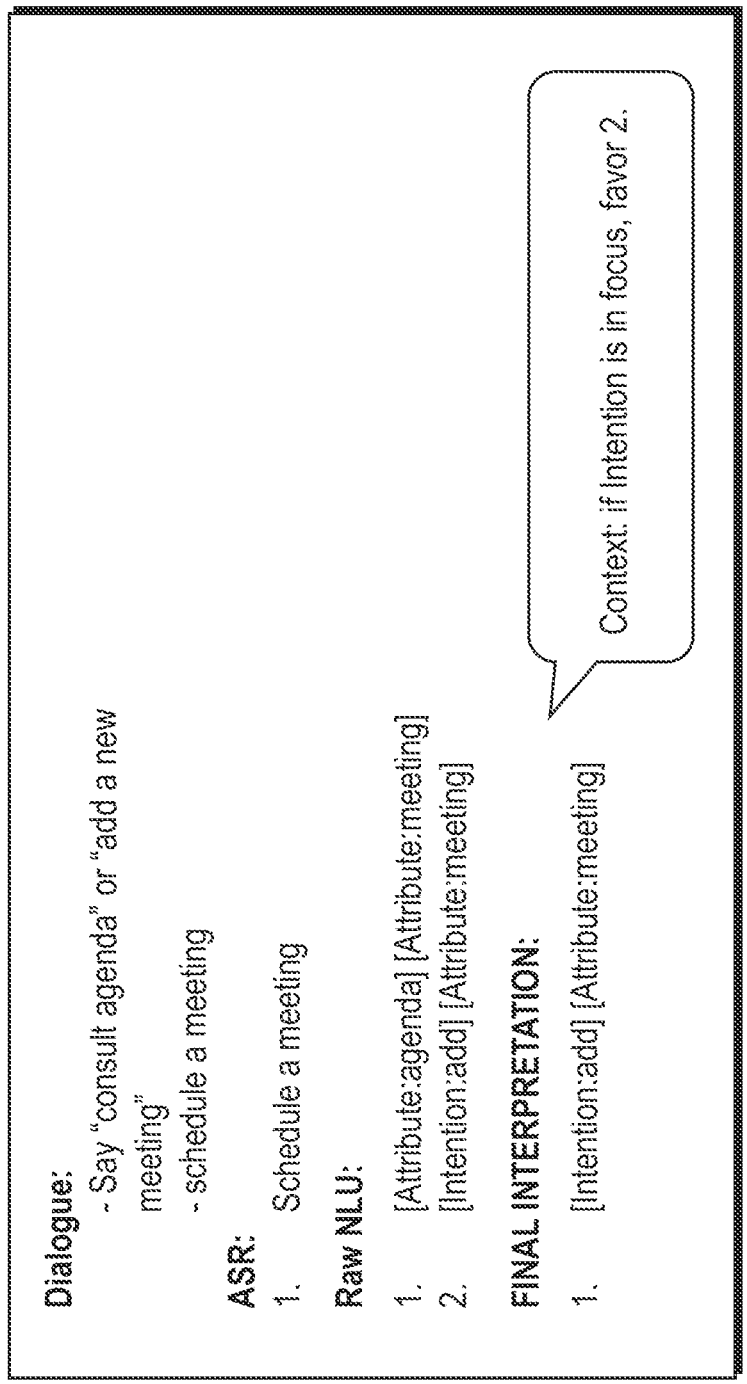

At FIG. 4A, the NLU module 130 generates two outputs in response to the user-input data "schedule a meeting." The DM core logic 254 selects the second output of the NLU module 130 since it includes an "intention" concept with intention being within the scope of the dialogue.

Figure 4B:
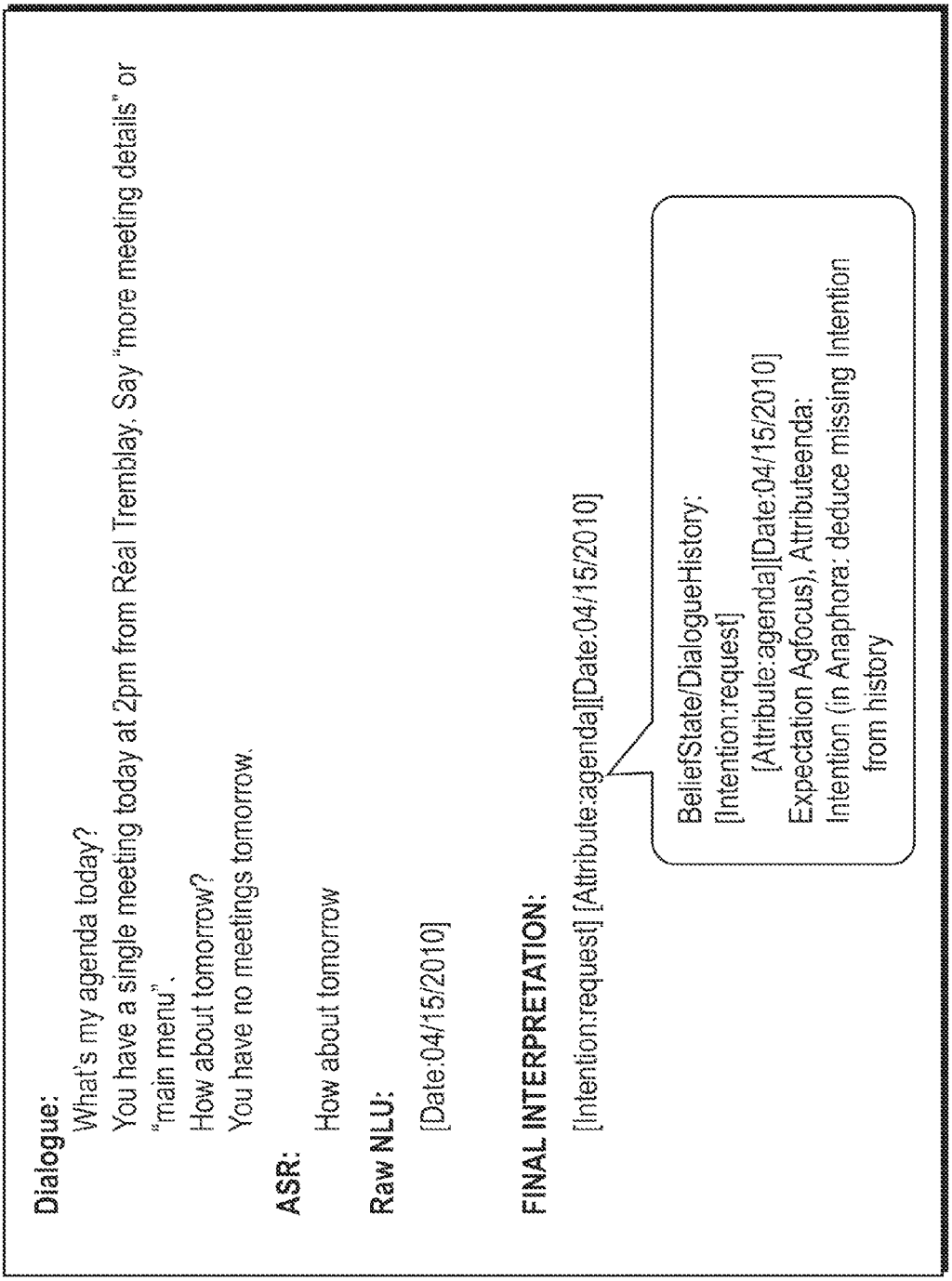

At FIG. 4B, the NLU module 130 generates the date corresponding to "tomorrow" in response to the user-input data "[h]ow about tomorrow." The DM core logic detects that the output of the NLU module 130 does not include an "intention" concept. Based on the dialogue history or the state of the dialog, the DM core logic 254 determines the user intention and generates an output including the user intention as well as the date provided by the NLU module 130, therefore, providing a complete description of the user request.

Figure 4C:
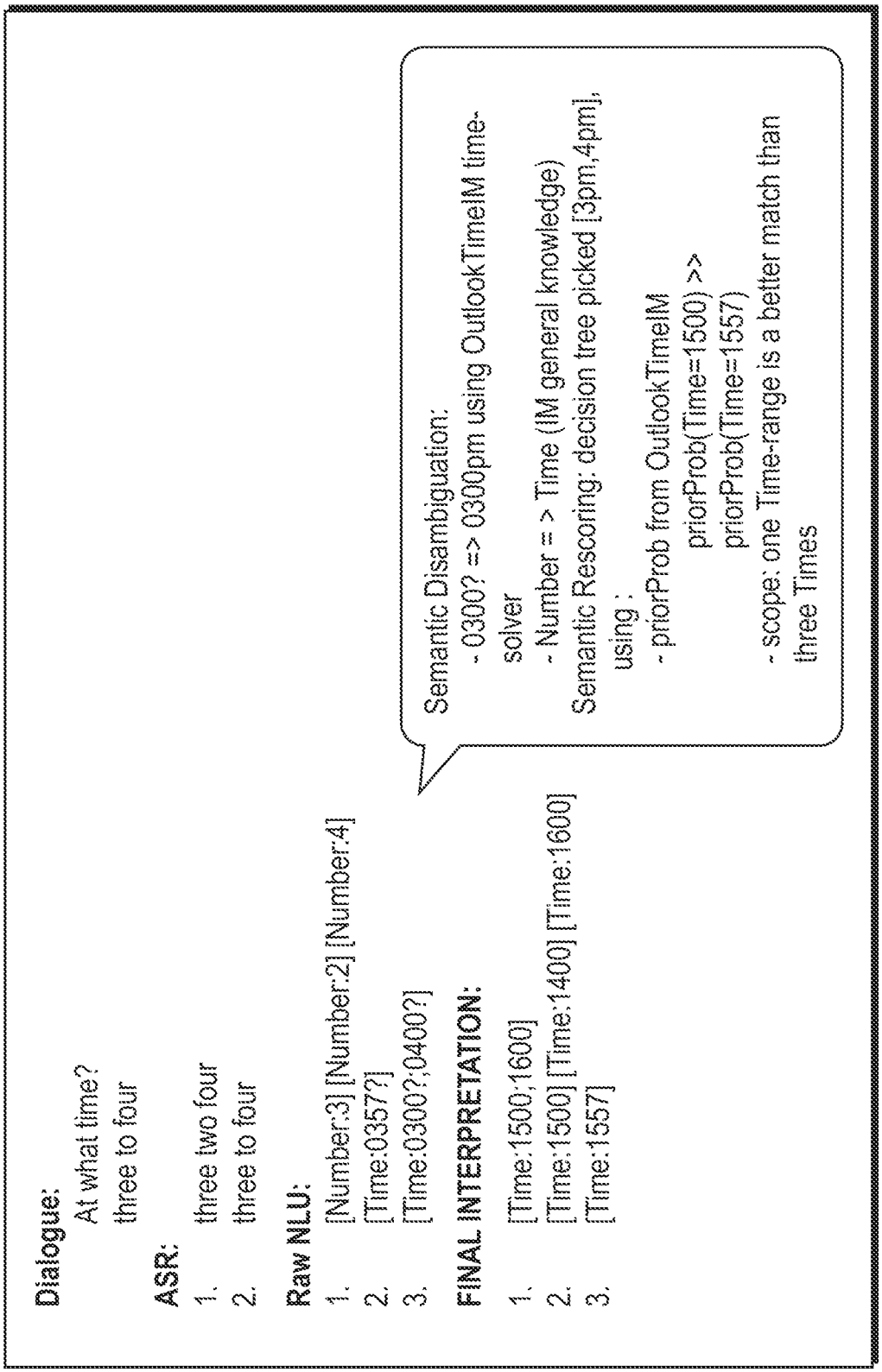

At FIG. 4C, the ASR module 120 provides two potential textual outputs corresponding to user-input speech data "three to four." The NLU module 130 produces three potential interpretations of outputs of the ASR module 120. The DM core logic 254 then makes use of general knowledge, e.g., outlook general knowledge to rank the outputs provided by the NLU module and select the most probable output. The DM core logic 254 may further add the "intention" concept, e.g., based on the dialogue history, the state of the dialogue, or the scope of the dialogue, once the most probable output is selected.

At FIG. 4D, the DM core logic 254 makes use of general knowledge, e.g., the current data to resolve ambiguity due to multiple outputs provided by the NLU module 130. In other words, given two potential dates associated with a meeting to be added, the DM core logic 254 uses, for example, the current date to select one of the potential dates.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., that enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. For example, a non-transitory machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of automatically managing a dialogue with a user, the method comprising:
generating a generic semantic representation based upon received user-input data, the generic semantic representation being independent of a language and an input modality associated with the received user-input data, the generic semantic representation comprising at least one of a list of semantic slots and a sequence of nested semantic slots;
determining a user-intention based upon the received user-input data, the generic semantic representation and at least one of: a maintained state of the dialogue, concept data representing one or more concepts, and history data representing history of the dialogue;
performing selection of a list of data items based on any of the concept data representing the one or more concepts and attribute data representing one or more attributes associated with the generic semantic representation; and
sending output data indicative of one or more actions for a dialogue application to perform, the one or more actions being determined based on a result of said determining the user-intention.

2. The method according to claim 1, wherein each slot of the semantic slots and the nested semantic slots includes a language-independent representation indicative of canonical meaning.

3. The method according to claim 2, wherein the language-independent representation includes a string of text characters.

4. The method according to claim 1, wherein the list of data items includes a hierarchical list of data items.

5. The method according to claim 1, wherein the selection is further performed based upon at least one of a rank and an instance associated with the list of data items.

6. The method according to claim 1, wherein a dialogue manager is configured to provide a measure of accuracy of the output data.

7. The method according to claim 1, wherein the input modality includes at least one of speech, text, touch, and computer device control.

8. The method according to claim 1, further comprising updating the maintained state of the dialogue based on the data representing the one or more attributes.

9. The method according to claim 1, wherein the selection is further based on at least one of the maintained state of the dialogue, the concept data representing the one or more concepts, and the history data representing the history of the dialogue.

10. An apparatus for automatically managing a dialogue with a user, the apparatus comprising:
a processor; and
a memory with computer code instructions stored thereon, the processor and the memory, with the computer code instructions, being configured to cause the apparatus to:
generate a generic semantic representation based upon received user-input data, the generic semantic representation being independent of a language and an input modality associated with the received user-input data, the generic semantic representation comprising at least one of a list of semantic slots and a sequence of nested semantic slots;
determine a user-intention based upon the received user-input data, the generic semantic representation, and at least one of: a maintained state of the dialogue, concept data representing one or more concepts, and history data representing history of the dialogue;
perform selection of a list of data items based on any of the concept data representing the one or more concepts and attribute data representing one or more attributes associated with the generic semantic representation; and
send output data indicative of one or more actions for a dialogue application to perform, the one or more actions being determined based on a result of said determining the user-intention.

11. The apparatus according to claim 10, wherein each slot of the semantic slots and the nested semantic slots includes a language-independent representation indicative of canonical meaning.

12. The apparatus according to claim 11, wherein the language-independent representation includes a string of text characters.

13. The apparatus according to claim 10, wherein the list of data items includes a hierarchical list of data items.

14. The apparatus according to claim 10, wherein the processor and the memory, with the computer code instructions, are configured to further cause the apparatus to perform selection based upon at least one of a rank and an instance associated with the list of data items.

15. The apparatus according to claim 10, wherein the processor and the memory, with the computer code instructions, are configured to further cause the apparatus to provide a measure of accuracy of the output data.

16. The apparatus according to claim 10, wherein the input modality includes at least one of speech, text, touch, and computer device control.

17. The apparatus according to claim 10, wherein the processor and the memory, with the computer code instructions, are configured to further cause the apparatus to update the maintained state of the dialogue based on the data representing the one or more attributes.

18. The apparatus according to claim 10, wherein the processor and the memory, with the computer code instructions, are configured to further cause the apparatus to perform selection based on at least one of the maintained state of the dialogue, the concept data representing the one or more concepts, and the history data representing the history of the dialogue.

19. A non-transitory computer-readable medium with software instructions stored thereon, the computer software instructions, when executed by a processor, cause an apparatus to:
generate a generic semantic representation based upon received user-input data, the generic semantic representation being independent of a language and an input modality associated with the received user-input data, the generic semantic representation comprising at least one of a list of semantic slots and a sequence of nested semantic slots;
determine a user-intention, based upon the received user-input data, the generic semantic representation, and at least one of: a maintained state of the dialogue, concept data representing one or more concepts, and history data representing history of the dialogue;
perform selection of a list of data items based on any of the concept data representing the one or more concepts and attribute data representing one or more attributes associated with the generic semantic representation; and
send output data indicative of one or more actions for a dialogue application to perform, the one or more actions being determined based on a result of said determining the user-intention.

20. The non-transitory computer-readable medium according to claim 19, wherein each slot of the semantic slots and the nested semantic slots includes a language-independent representation indicative of canonical meaning.

* * * * *